United States Patent

[11] 3,604,250

| | | |
|---|---|---|
| [72] | Inventor | Willem A. Grandia<br>Charlotte Harbor, Fla. |
| [21] | Appl. No. | 867,853 |
| [22] | Filed | Oct. 20, 1969 |
| [45] | Patented | Sept. 14, 1971 |
| [73] | Assignees | Air Products and Chemicals, Inc.;<br>North American Rockwell Corporation,<br>part interest to each<br>Continuation of application Ser. No.<br>598,018, Nov. 30, 1966, now abandoned. |

[54] COUPLING NETWORK FOR AN ULTRASONIC TESTING SYSTEM
4 Claims, 5 Drawing Figs.

[52] U.S. Cl. .................................................. 73/67.5
[51] Int. Cl. .................................................. G01n 24/00
[50] Field of Search ......................................... 73/67.5,
67.7, 67.8, 67.9

[56] References Cited
UNITED STATES PATENTS

| | | | |
|---|---|---|---|
| 2,534,006 | 12/1950 | Delano et al. ................ | 73/67 |
| 2,562,449 | 7/1951 | Delano et al. ................ | 73/67 |
| 2,949,028 | 8/1960 | Joy .............................. | 73/67.9 |
| 3,038,328 | 6/1962 | Henry ......................... | 73/67.9 |
| 3,140,600 | 7/1964 | Howry ........................ | 73/67.7 |
| 3,274,821 | 9/1966 | Weighart ..................... | 73/67.8 |

*Primary Examiner*—Richard C. Queisser
*Assistant Examiner*—Arthur E. Korkosz
*Attorneys*—Ronald B. Sherer, James C. Simmons and B. Max Klevit

ABSTRACT: This disclosure relates to an ultrasonic-testing system, and includes circuitry for damping low frequency oscillations in an ultrasonic transmitted pulse signal. A low frequency filter is connected across a limiting circuit to dampen low frequency signals to permit reflected signals from short distances to be detected.

PATENTED SEP 14 1971

3,604,250

INVENTOR.
Willem A. Grandia,
BY.
R Sadler
ATTORNEY.

COUPLING NETWORK FOR AN ULTRASONIC TESTING SYSTEM

CROSS REFERENCE TO RELATED APPLICATION

This application is a continuation of copending application for U.S. Letters Pat., Ser. No. 598,018, filed Nov, 30, 1966, now abandoned for Coupling Network for an Ultrasonic Testing System, on behalf of Willem A. Grandia, and assigned to the assignee of this invention.

BACKGROUND OF THE INVENTION

Ultrasonic testing systems for detecting flaws in materials are well known. In such systems, ultrasonic pulse signals are transmitted through a suitable conducting medium to an object under test. Signals are reflected back to a receiver when flaws are encountered in the material. Analysis of the reflected signals permits an operator to determine the location and nature of a flaw within the material.

Specifically, in the prior art there is provided electrical nondestructive test equipment which generates ultrasonic vibrations by use of a crystal transducer. The vibrations from the transducers are then sent in the form of an acoustic pulse beamed into the workpiece being tested. The beam travels unimpeded through the workpiece and reflects back from the surfaces thereof. Any flaw, defect, or other discontinuity in the workpiece, also causes reflections of the acoustical beam back to the instrument which indicate the location and size of the discontinuity on a display such as an oscilloscope.

The echo return energy is amplified and displayed on the oscilloscope as vertical spikes. The screen on the oscilloscope shows spikes of the initial pulse, the defect, and the front and back surface reflections of the workpiece. Spacing of the spikes on the oscilloscope is in proportion to the distance the beam travels and the material tested, thus locating the position of any flaw by irregularly spaced spikes.

In order to detect reflected signals from very short ranges, the transmitted pulse signals should be of very short duration. If the wave train of the transmitted pulse is relatively long, reflected signals from a surface or flaw will be received before the transmitted pulse has ended, thereby making it difficult to detect the reflected signals.

In the past, the transducer which in many cases is a piezoelectric quartz crystal, has been mechanically loaded. Despite this, however, oscillation or "ringing" continues to take place for a predetermined time. This ringing condition has the same effect as prolonging the duration of the transmitted signal. That is, the transducer has been physically supported as one means to dampen the mechanical movement when excited by an electrical pulse, but such methods have been ineffective and the oscillation of the crystal material continues regardless of the mechanical dampening.

In ultrasonic transducers used for pulse transmission, the transducer tends to ring or to stretch the transmitted pulse signal, since the transmitted signal generally involves a number of cycles of signals in the ultrasonic range. This effect limits the resolution of such a system, i.e., the ability to detect a small reflected signal immediately after a large transmitted signal is limited.

In many ultrasonic testing systems, limiting networks are included in the input circuit to the receiver. These limiting networks prevent the receiver from becoming saturated by very high transmitted signals, thereby minimizing the recovery time of the receiver. The short recovery time makes it possible for the receiver to detect signals received shortly after the transmitted signal is limited.

In accordance with the present disclosure, an ultrasonic testing system includes means for generating and transmitting an ultrasonic pulse signal. A receiver is employed to receive the transmitted pulse signal and reflected signals which may be reflected from a surface of a material under test or a flaw within the material. A coupling network is provided at the input circuit of the receiver. The coupling network includes a limiting circuit for limiting the amplitude of the signal applied to the receiver. A filter is connected across the limiting circuit to suppress low frequency components of signals applied to the receiver.

Specifically, the present disclosure relates to an ultrasonic nondestructive material tester for testing a workpiece for flaws, defects or other discontinuities which includes a pulse-generating means which generates electrical test pulses. A transducer is included and is acoustically coupled to the workpiece. The pulse generator applies periodic pulses to the transducer which in turn transmits corresponding acoustical pulses into the workpiece. Echoes from the transmitted pulse are received by the transducer and converted into corresponding electrical echo pulses. A filter means is coupled to receive the echo pulses and adapted to filter out the low frequency components from the echo pulses. By filtering out these low frequency components which in effect is a DC level, the amplitude of the signal is lowered to acceptable voltage levels without materially affecting the high frequency echo pulses. Further, the amplitude of the high frequency echo pulses is limited to an acceptable range.

A feature of this invention is that the return echo signals are presented to the receiver at a relatively low voltage level which prevents saturation of the receiver. This provides interference between the received transmitted pulses. The duration of the transmitted pulses with relation to the received pulse is materially reduced.

DESCRIPTION OF THE DRAWINGS

These and other features and advantages will be more apparent to those skilled in the art when taken into consideration with the following detailed description, wherein like reference numerals indicate like and corresponding parts throughout the several views, and wherein.

DETAILED DESCRIPTION OF THE DRAWINGS

Figure 1:
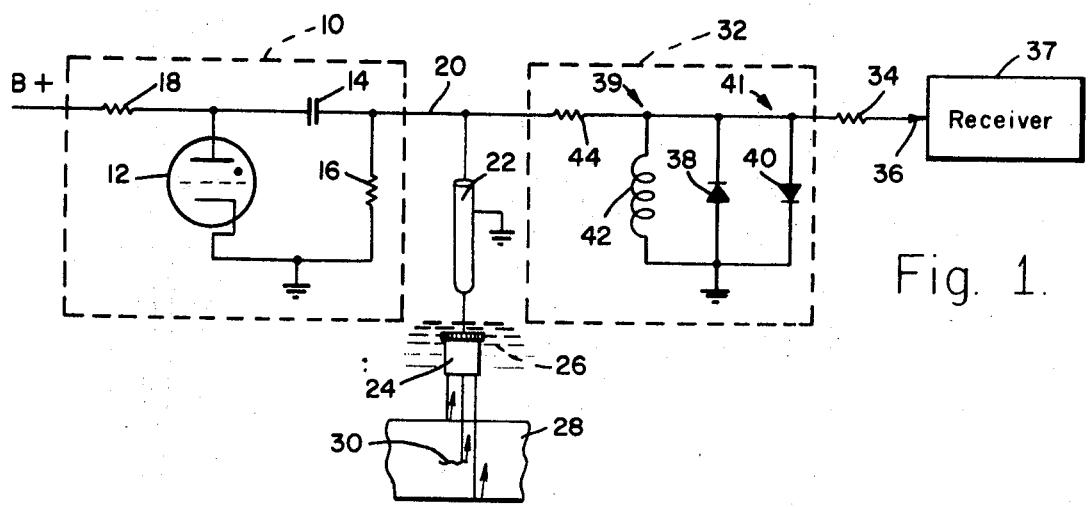
FIG. 1 is a schematic diagram illustrating the subject invention.
Figure 2:
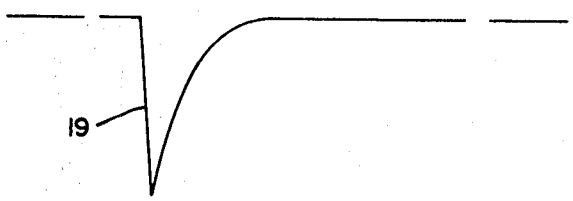
FIGS. 2, 3, 4 and 5 are wave forms shown for purposes of illustrating the operation of the subject invention.

Referring particularly to FIG. 1, a transmitter 10 comprises a thyratron tube 12. A capacitor 14 and a resistor 16 are connected across the anode-cathode circuit of the tube 12. The anode of the tube 12 is suitably connected to a source B+ through a resistor 18. An output signal from the transmitter 10 is developed at the line 20. This output signal is a negative signal, such as illustrated in FIG. 2. Because transmitting and generating means for producing pulse signals are well known to those skilled in the field, all the details relating to such circuitry are not illustrated in detail. In general, however, it may be stated that the nature and shape of the pulse signal 19, illustrated in FIG. 2, are dependent upon the time constant of the capacitor 14 and the resistor 16.

The signal produced at the line 20 is applied to an ultrasonic transducer 24 via a coaxial cable 22 which has both reactance and resistance components therein, as is well known to those skilled in the art. The transducer 24 may be piezoelectric crystal for generating ultrasonic signals. The transducer 24, when energized by the transmitted pulse 19, will oscillate in its thickness mode to produce ultrasonic signals for a time equal to the duration of the transmitted pulse 19. The transducer 24 may be designed to oscillate at various ultrasonic frequencies in a range varying, for example, from 100 kilocycles to 24 megacycles or above.

The width of the transmitted pulse may vary in accordance with the particular design feature of the system. For example, the duration of the transmitted pulse may be in the order of 1 microsecond. It is seen that if the duration of the transmitted pulse is 1 microsecond, and the frequency of oscillation of the transducer 24 is much higher, that a number of ultrasonic signals will be generated for the duration of the transmitted pulse period with the number of generated cycles being dependent upon the operating frequency of the transducer.

Ultrasonic signals are transmitted from the transducer into a conducting medium 26, which may be water or any other suitable transmitting fluid. The ultrasonic signal from transducer 24 is transmitted to an object under test 28. A flaw 30 is illustrated within the object under test. This flaw may be a crack or any other discontinuity within the object under test.

As is well known in ultrasonic testing systems, a flaw within the material under test will cause a signal to be reflected back to the transducer 24. This reflected signal is applied to a receiver where it is analyzed to determine the nature and location of the flaw 30. Details relating to an overall ultrasonic system are not illustrated, since they are well known to those skilled in the field. For example, various reflected signals from the surface of the material 28 may be present. The transducer may be in physical contact with the material under test if desired.

The signals from a transducer 24 are applied to a coupling network 32. The output signal from the coupling network 32 is applied to the input circuit of a receiver 37 through a resistor 34 and the line 36.

The initial transmit pulse 19 is also received by the receiver 37 and, were it not for the coupling network 32 hereinafter to be described, this initial pulse tends to saturate receiver 37. The long recovery time of the receiver 37 due to continuing transmitted signal causes an interference with pulses received from within the workpiece 28. These received pulses are often difficult to distinguish from the initial pulses. Inaccurate readings of the internal structure of the workpiece 28 result therefrom. Thus, the purpose of the coupling network 32 is to attenuate and dampen out high voltage components from the initial transmitted pulses before they are applied to the receiver 37. The coupling network, therefore, includes a high pass filter which passes electrical signals at high frequencies and low frequency components (DC levels, for example) are then shunted to ground.

A clipping network 41 is included, which clips out both the negative and positive peaks of the high frequency signals and thereby presents the initial pulse and the reflected pulses within an acceptable range and prevents saturation of the receiver 37.

A high pass filter 42 is connected across the diodes 38 and 40 for a purpose to be described. The filter comprises a coil which provides a low impedance to ground for signals within a certain range. The signals from the transducer 24 are applied through a resistor 44 to the filter 42 which is connected in parallel with the pair of diodes 38 and 40.

The coupling network 32 comprises a pair of back-to-back limiting diodes 38 and 40. These diodes have a characteristic that they are nonconducting until the applied signal exceeds a predetermined amplitude. These may be zener diodes. The purpose of the limiting network including the back-to-back diodes is to prevent the saturation of the receiver by signals of very high amplitude. For example, the transmitted signal which is also applied to the receiver, may be of a high amplitude sufficient to saturate the receiver. Prevention of the saturation of the receiver is desirable because it takes a certain amount of time for the receiver to recover sufficiently so as to be able to detect input signals applied thereto. Long recovery time of the receiver 37 makes it impractical to detect signals from short ranges.

Figure 3:
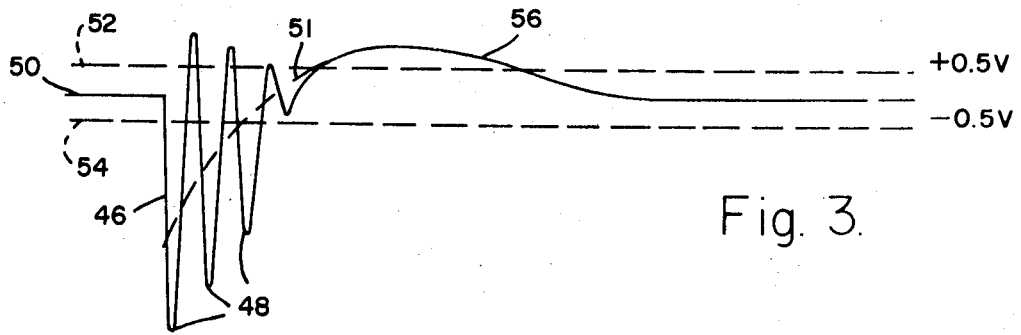
Figure 4:
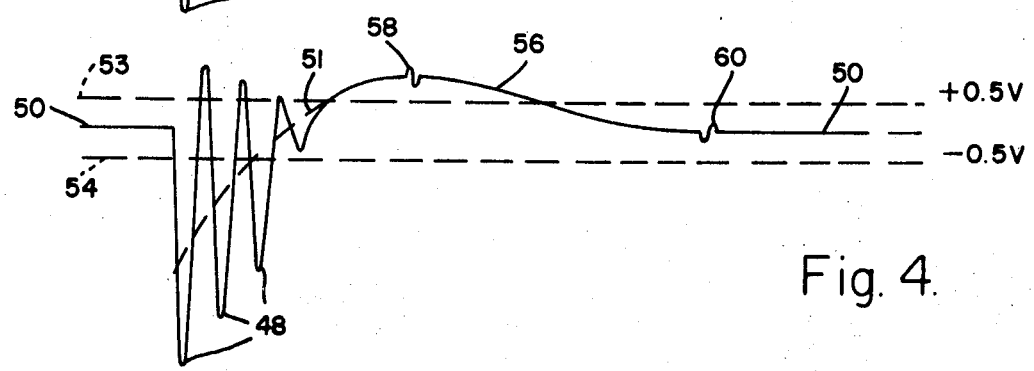

Referring particularly to FIGS. 3 and 4, an ultrasonic signal 46 comprises a number of cycles 48, which may be considered relatively high frequency ultrasonic signals. The line 50 represents the normal input level of the receiver 37 with no signal applied. The dotted line 52 represents the level at which the diode 38 will conduct. The dotted line 54 represents the negative voltage level at which the diode 40 will start to conduct. When either of the diodes 38 or 40 start to conduct, a limiting action takes place. Thus, the maximum signal applied to the receiver is limited to predetermined voltage levels of, for example, a plus 0.5 volts or a minus 0.5 volts. These limited signals prevent the receiver 37 from becoming saturated, thereby minimizing the recovery time necessary to permit the receiver to detect reflected signals from close ranges, i.e., the distance between the transducer 24 and the workpiece 28. Thus it may be said that the receiver 37 is capable of detecting signals only within the range between plus 0.5 volts and minus 0.5 volts, as indicated by dotted lines 52 and 54. Any reflected signals generated outside of the range indicated will not be detected by the receiver 37 due to the limiting action of the diodes.

In examining the wave forms of FIGS. 3 and 4, it is noted that the ultrasonic signal 46 exponentially decays. The base line of the ultrasonic signal is displaced to conform with the pulse 19 as indicated by dashed line 51, and low frequency oscillations continuing after the decay of the ultrasonic signals. These low frequency oscillations are produced by pulse 19 shock-exciting the R-L circuit including the inductive reactance of coaxial cable 22 and the resistance of resistor 16.

The receiver is incapable of receiving any reflected signals during the time that the ultrasonic transmitted signal is being transmitted. The ultrasonic cycles 48 exceed the limiting voltages illustrated by the dotted lines 52 and 54 for the duration of he transmitted pulse. At the trailing edge of the ultrasonic signal 46, low frequency signals represented for example by a cycle 56 become apparent, as discussed hereinabove. The amplitude of this low frequency signal exceeds the level 52. Any reflected ultrasonic signal received while this low frequency signal exceeds the level 52 will not be detected by the receiver since it will be clipped by the limiting action of diode 38.

This condition is more clearly indicated in FIG. 4 where substantially the same ultrasonic signal 46 is illustrated. In this case, a reflected signal 58 is received by the transducer 24. This signal 58 may represent a flaw signal in the material 28 under test. As mentioned, since the input signal and the receiver already exceed the level 52, the signal 58 will not be detected by the receiver. Once the oscillations of the transducer 24 are damped to a certain point, the signal level at the receiver 37 approaches the level 50. This condition permits the receiver to detect flaw signals, such as a flaw signal 60. It is noted that the decay time of low frequency oscillation 56, and, therefore, the effective recovery time of the receiver illustrated in connection with FIGS. 3 and 4 is relatively long, thereby preventing the detection of signals reflected from a short range. The subject invention eliminates the blocking problem of receiver 37 set forth by reducing the levels of the voltages applied to the receiver 37 in a minimum amount of time. As noted, the cycles 48 may be considered as being a relatively high frequency signal with respect to signals 56 which may be considered as a low frequency signal.

Referring to FIG. 1, the filter 42 is connected across the diode 38 and 40 to dampen or to provide a low impedance path for low frequency signals such as the signal represented by the cycle 56. The filter 42 comprises a coil having capacitance between its windings and may be designed by bypass signals of predetermined frequencies. At the same time, the filter 42 provides a high impedance for high frequency signals as represented by the cycle 48.

In accordance with the present invention, a filter 39 is provided for low frequency signals which effectively lowers the amplitude of these signals so as to being them within the ranges illustrated by the lines 52 and 54. This permits any reflected signal superimposed thereon to be detected.

Figure 5:
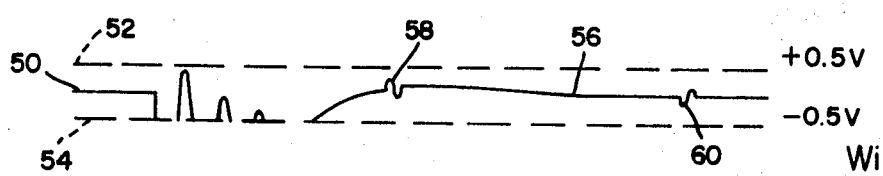

Referring particularly to FIG. 5, the signals within the range of detection by the receiver 37 are further illustrated when employing the present invention. It is seen that the cycle 56 is substantially reduced by being shunted to ground by the high pass filter 42, and is very close to level 50. Consequently the signal 58 is within the range of detection by the receiver 37 represented by the lines 52 and 54. The signals illustrated in FIG. 5 represent the signals applied to the receiver after being filtered by high pass filter 42 and clipped or limited by the diodes 38 and 40. It will be noted that the high voltage, high frequency transmitted signal 48 is clipped by diodes 38 and 40 before being applied to the receiver.

Thus the device set forth in the described embodiment has provided a relatively simple means for increasing the range of detection for a receiver in an ultrasonic testing system. This is accomplished by effectively shortening the duration of the transmitted pulse by attenuating the low frequency component and clipping the high frequency component within the transmitted pulse.

Having thus described but one embodiment of this invention, what is claimed is:

1. An ultrasonic nondestructive material tester for testing a workpiece for flaws, defects, or other discontinuities, said tester including:

a pulse generator adapted to generate electrical test pulses;

a transducer being adapted to be coupled to said workpiece, said transducer being responsive to said electrical test pulses and to transmit corresponding acoustical pulses into said workpiece, said transducer being further adapted to receive the acoustical echo pulses from said workpiece and generate corresponding electrical echo pulses;

means for receiving and displaying said echo pulses;

filter means between said transducer and said receiving means for filtering primarily low frequency components from said received echo pulses thereby substantially removing a DC signal component and lowering the amplitude of said received pulses into acceptable receive voltage levels without materially affecting the high frequency pulses; and means for limiting the amplitude of the received echo pulses into a predetermined acceptable receive range.

2. The tester as defined in claim 1 wherein said transducer being a piezoelectric crystal.

3. The tester as defined in claim 1 wherein said filter means is a high pass filter including an inductance.

4. The system as defined in claim 3 wherein said limiting means includes a pair of diodes coupled in parallel with said inductance and in opposing polarity, said diodes having a predetermined offset voltage.